United States Patent
Hessling-Von Heimendahl et al.

(10) Patent No.: US 12,054,284 B2
(45) Date of Patent: Aug. 6, 2024

(54) EXTERIOR AIRCRAFT LIGHT, AIRCRAFT COMPRISING AN EXTERIOR AIRCRAFT LIGHT, AND METHOD FOR PROVIDING AN EXTENT OF EROSION OF AN EXTERIOR SURFACE OF A LIGHT TRANSMISSIVE COVER OF AN EXTERIOR AIRCRAFT LIGHT

(71) Applicant: Goodrich Lighting Systems GmbH & Co. KG, Lippstadt (DE)

(72) Inventors: Andre Hessling-Von Heimendahl, Koblenz (DE); Marion Depta, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/450,758

(22) Filed: Aug. 16, 2023

(65) Prior Publication Data
US 2024/0059427 A1    Feb. 22, 2024

(30) Foreign Application Priority Data
Aug. 18, 2022  (EP) .................................... 22190995

(51) Int. Cl.
*B64D 47/02*    (2006.01)
*B64D 45/00*    (2006.01)
*G01N 21/958*    (2006.01)

(52) U.S. Cl.
CPC ........... *B64D 47/02* (2013.01); *G01N 21/958* (2013.01); *B64D 2045/0085* (2013.01)

(58) Field of Classification Search
CPC ...... B64D 47/02; B64D 47/06; F21V 23/0457
See application file for complete search history.

(56) References Cited

U.S. PATENT DOCUMENTS 6,196,704 B1 *  3/2001  Gauch ................... B60S 1/0822
                                                                362/276
7,288,750 B2  10/2007  Ewig et al.
(Continued)

FOREIGN PATENT DOCUMENTS

EP  2960643 A1 * 12/2015 ........... B60Q 1/0023
EP  3073249 A1    9/2016
(Continued)

OTHER PUBLICATIONS

European Search Report for Application No. 22190995.5, mailed Jan. 5, 2023, 8 pages.

*Primary Examiner* — Alexander K Garlen
(74) *Attorney, Agent, or Firm* — CANTOR COLBURN LLP

(57) ABSTRACT

An exterior aircraft light includes a support and a light transmissive cover having a light transmissive body with an interior surface and an exterior surface. The light includes at least one light source arranged between the support and the light transmissive cover; and a first light detector. The light transmissive cover has a first light guide path within the light transmissive body from a first light entry region to a first light exit region, wherein the first light detector is arranged to receive light that travels along the first light guide path and that exits the light transmissive cover at the first light exit region. The first light detector is configured to provide sensor measurements corresponding to the amount of light incident on the first light detector.

16 Claims, 9 Drawing Sheets

(56) References Cited

U.S. PATENT DOCUMENTS

| | | | |
|---|---|---|---|
| 7,950,832 B2* | 5/2011 | Tanaka | H05B 45/22 |
| | | | 362/803 |
| 9,846,112 B2 | 12/2017 | Jha et al. | |
| 10,151,708 B2 | 12/2018 | Hessling-Von Heimendahl et al. | |
| 11,225,336 B2 | 1/2022 | Hessling-Von Heimendahl et al. | |
| 2007/0035954 A1 | 2/2007 | Schanz et al. | |
| 2016/0282283 A1* | 9/2016 | Hessling-Von Heimendahl | G01N 21/47 |
| 2017/0181246 A1* | 6/2017 | Hessling-Von Heimendahl | B64D 47/02 |
| 2019/0144132 A1* | 5/2019 | Jha | H05K 1/181 |
| | | | 362/470 |
| 2019/0359348 A1* | 11/2019 | Pawliczek | B64D 47/04 |
| 2020/0189766 A1* | 6/2020 | Jha | G08G 5/045 |
| 2021/0122494 A1* | 4/2021 | Hessling-Von Heimendahl | H05B 47/20 |

FOREIGN PATENT DOCUMENTS

| | | |
|---|---|---|
| EP | 3812285 A1 | 4/2021 |
| EP | 3825234 A1 | 5/2021 |

* cited by examiner

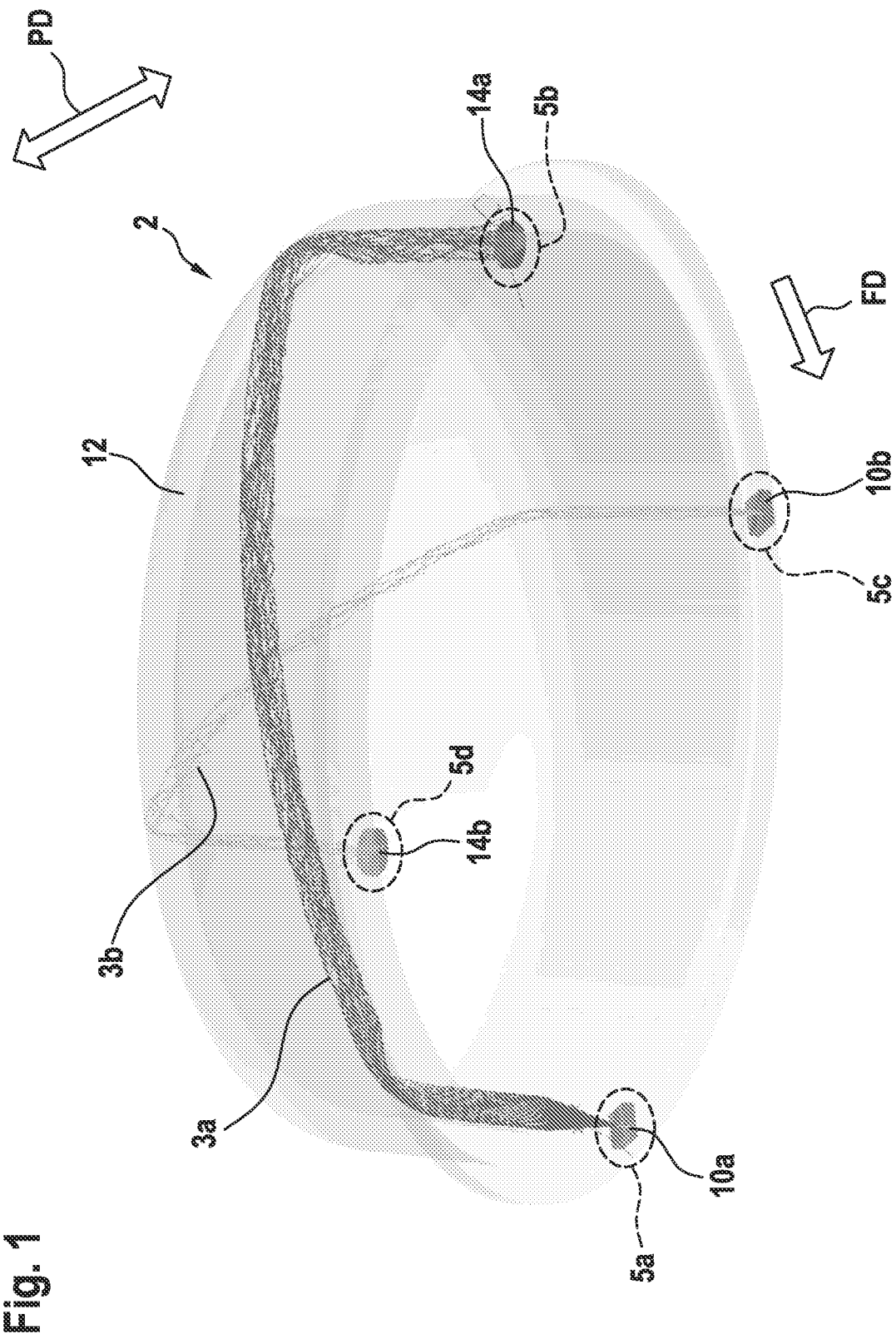

EXTERIOR AIRCRAFT LIGHT, AIRCRAFT COMPRISING AN EXTERIOR AIRCRAFT LIGHT, AND METHOD FOR PROVIDING AN EXTENT OF EROSION OF AN EXTERIOR SURFACE OF A LIGHT TRANSMISSIVE COVER OF AN EXTERIOR AIRCRAFT LIGHT

CROSS REFERENCE TO RELATED APPLICATION

This application claims priority to European Patent Application No. 22190995.5 filed Aug. 18, 2022, the entire contents of which is incorporated herein by reference.

TECHNICAL FIELD

The present invention relates to an exterior aircraft light, to an aircraft comprising such an exterior aircraft light, and to a method for providing an indication regarding an extent of erosion of an exterior surface of a light transmissive cover of an exterior aircraft light.

BACKGROUND

Almost all aircraft are equipped with exterior aircraft lights. In particular, large passenger air planes are provided with a wide variety of exterior aircraft lights. The exterior aircraft lights are provided for a wide variety of different purposes, such as for allowing the passengers and/or air crew to view the outside, for passive visibility, for signalling purposes, etc. Examples of such exterior aircraft lights are navigation lights, also referred to as position lights, red-flashing beacon lights, white strobe anti-collision lights, wing scan lights, take-off lights, landing lights, taxi lights, runway turn-off lights, etc.

Exterior aircraft lights are exposed to very hazardous conditions. They have to withstand large aerodynamic forces, excessive particle impacts at high travelling velocities, as well as large temperature variations. In particular, both very low temperatures, due to the high cruising altitude, as well as very high temperatures, due to turbine exhaust, may potentially be present in the environment of exterior aircraft lights. The hazardous conditions cause erosion on an exterior surface of a light transmissive cover of an external aircraft light, which may eventually degrade the light output of the external aircraft light in an unacceptable manner. Up until now, such erosion has been assessed mainly by highly subjective observations with naked eyes.

Accordingly, it would be beneficial to provide an exterior aircraft light that has functionality of detecting an extent of erosion of an exterior surface of a light transmissive cover thereof. Further, it would be beneficial to provide an aircraft with such an exterior aircraft light.

SUMMARY

Exemplary embodiments of the invention include an aircraft beacon light comprising a support; a light transmissive cover, the light transmissive cover having a light transmissive body with an interior surface and an exterior surface; at least one light source arranged between the support and the light transmissive cover; and a first light detector; wherein the light transmissive cover has a first light guide path within the light transmissive body from a first light entry region to a first light exit region, wherein the first light detector is arranged to receive light that travels along the first light guide path and that exits the light transmissive cover at the first light exit region and wherein the first light detector is configured to provide sensor measurements corresponding to the amount of light incident on the first light detector, and wherein the exterior aircraft light is configured to provide an indication regarding an extent of erosion of the exterior surface of the light transmissive cover on the basis of the sensor measurements of the first light detector.

The exterior aircraft light comprises at least one light source. The at least one light source provides the desired light output according to the desired functionality of the exterior aircraft light. For example, in case the exterior aircraft light is a red-flashing beacon light, the at least one light source is that light source that provides the beacon light output. In the given example, the at least one light source may be a set of red-flashing LEDs.

The light transmissive cover has a first light guide path within the light transmissive body. The term light guide path refers to a light passing path/to a wave guiding path within the light transmissive body, through which light waves pass from the first light entry region to the first light exit region by total internal reflection. As will be laid out below, the light that travels along the first light guide path may come from the at least one light source or may come from an ancillary light source that is dedicated to the erosion detection functionality, herein also referred to as first light emitter.

The exterior aircraft light is configured to provide an indication regarding the extent of erosion of the exterior surface of the light transmissive cover on the basis of the sensor measurements of the first light detector. In an embodiment, the exterior aircraft light may comprise a processor that is configured to process the sensor measurements and to, thereby, provide an indication regarding an extent of erosion of the exterior surface of the light transmissive cover. In another embodiment, the exterior aircraft may comprise a data interface for providing an external entity with raw data of the detected sensor measurements, which may be evaluated by the external entity to provide the indication regarding the extent of erosion. In the latter case, the external entity may be seen as a functional component of the exterior aircraft light for the provision of the indication regarding the extent of erosion. Also, the raw data of the detected sensor measurements may already be seen as an indication regarding the extent of erosion.

As discussed above, an exterior aircraft light may be subject to large aerodynamic forces, to extensive particle impact as well as to large temperature variations during flight of the aircraft to which it is mounted. Such harsh conditions cause erosion on a surface of a light transmissive cover, i.e. a lens cover, of the exterior aircraft light. The erosion of the surface of the light transmissive cover affects transmittance of light through the light transmissive body of the light transmissive cover. That is, the more eroded the surface is, the more light is diverted by the light transmissive body in an undesired manner. The erosion may reach a point where the exterior aircraft light can no longer fulfill the specifications expected by legal regulations and/or by aircraft operators and/or aircraft manufacturers.

Exemplary embodiments of the invention allow for a very direct and highly reliable determination of the extent of erosion. When using the light transmissive body of the light transmissive cover as a wave guide, the erosion on the exterior surface deteriorates the light passing properties of the wave guide. Upon observing the amount of light incident on the first light detector over time, a highly reliable measure for the development of the light passing quality of the wave guide may be obtained. This measure may provide a direct indication regarding the extent of erosion of the light transmissive cover. Exemplary embodiments of the invention allow for an extent of erosion of the exterior surface of the light transmissive cover of the exterior aircraft light to be assessed in an automated, objective and highly reliable manner.

According to an embodiment, the exterior aircraft light further comprises a first optical diverter, the first optical diverter being arranged to couple a portion of the light, emitted by the at least one light source, into the light transmissive cover at the first light entry region. In this way, part of light emitted by the at least one light source, which provides the desired aircraft light output, can be used for the purpose of assessing the extent of erosion of the exterior surface of the light transmissive cover, so that a separate light emitter is not required.

According to an embodiment, the exterior aircraft light further comprises a first light emitter, which is arranged to emit light into the light transmissive cover at the first light entry region. The exterior aircraft light may further comprise a first light entry optical coupler, arranged to guide light from the first light emitter into the first light transmissive cover at the first light entry region. The first light emitter is a dedicated light source for sensor functionality. In other words, the first light emitter is a light source that is provided for the purpose of sending light along the first light guide path within the light transmissive body of the light transmissive cover. While some of the light of the first light emitter may accidentally contribute to the desired functionality of the aircraft light, the first light emitter may be arranged not to primarily contribute to the aircraft light functionality. The first light entry optical coupler may be arranged to guide light from the first light emitter into the first light transmissive cover and into or onto the first light guide path.

According to an embodiment, the exterior aircraft light further comprises a first light exit optical coupler arranged to guide light from the first light exit region to the first light detector. The first light exit optical coupler may be arranged to guide light, coming along the first light guide path, from the first light exit region of the light transmissive cover to the first light detector.

The dedicated light emitter and/or the first light entry and light exit optical couplers may allow for the amount of light, guided along the intended direction of the first light guide path, to be largely increased, so that efficiency and accuracy of assessment of the extent of erosion of the exterior surface may be enhanced.

According to an embodiment, the first light detector and/or the first light emitter are arranged on a back side of the support. In particular, the exterior aircraft light may further comprise a first light exit reflector arranged to reflect light from the first light exit region to the first light detector and/or a first light entry reflector arranged to reflect light from the first light emitter to the first light entry region. The term back side of the support is used to denote the side of the support opposite to the side of the support where the at least one light source and the light transmissive cover are arranged. In this way, interferences between light from the at least one light source and light from the first light emitter may be avoided or reduced, so that both the at least one light source and the first light emitter may perform their functionalities without those interferences/with lower interferences. Also, arranging the first light detector and/or the first light emitter on the back side of the support may allow for the sensor measurements to be less dependent on ambient light/sun light, thus contributing to the provision of a highly reliable indication regarding the extent or erosion under a wide range of operating conditions.

According to an embodiment, the exterior aircraft light is configured to provide the indication regarding the extent of erosion of the exterior surface of the light transmissive cover based on a comparison of the detected amount of light with a threshold value. The threshold value may in particular be set based on an initial amount of light which is detected by the first light detector before the exterior aircraft light is used in the field. The comparison with a threshold value may allow for a straightforward, objective, and highly reliable implementation of a yes/no criterion whether the light transmissive cover needs maintenance/replacement.

According to an embodiment, the first light guide path extends between opposing end portions of the light transmissive cover.

According to an embodiment, the exterior aircraft light is a fuselage-mounted red-flashing beacon light and the first light guide path extends between a front portion of the light transmissive cover and a rear portion of the light transmissive cover. With the front portion of the light transmissive cover of a fuselage-mounted red-flashing beacon light being particularly exposed to particle impact during flight, the first light guide path between the front portion of the light transmissive cover the rear portion of the light transmissive cover is particularly prone to deterioration due to erosion. Accordingly, the erosion of the light transmissive cover may be determined particularly reliably. Also, an early indication regarding the erosion of the light transmissive cover may be obtained in a reliable manner.

According to an embodiment, the exterior aircraft light is a wing front edge light, such as a wing tip aircraft navigation light or a wing tip white strobe anti-collision light or a wing tip red-flashing beacon light, and wherein the first light guide path extends along a wing front edge portion of the light transmissive cover. With the wing front edge portion of the light transmissive cover being particularly exposed to particle impact during flight, the first light guide path along the wing front edge portion is particularly prone to deterioration due to erosion. Accordingly, the erosion of the light transmissive cover may be determined particularly reliably. Also, an early indication regarding the erosion of the light transmissive cover may be obtained in a reliable manner.

In the described exemplary arrangements of the first light guide path, at least part of the first light guide path may extend along that part of the exterior surface of the light transmissive cover where erosion occurs most heavily, so that the extent of erosion of the exterior surface of the light transmissive cover may be assessed in a particularly precise manner.

According to an embodiment, the exterior aircraft light further comprises a second light detector, wherein the light transmissive cover has a second light guide path from a second light entry region to a second light exit region, wherein the second light detector is arranged to receive light that travels along the second light guide path and that exits the light transmissive cover at the second light exit region and wherein the second light detector is configured to provide sensor measurements corresponding to the amount of light incident on the second light detector, and wherein the exterior aircraft light is configured to provide the indication regarding the extent of erosion of the exterior surface of the light transmissive cover on the basis of the sensor measurements of the first light detector and the sensor measurements of the second light detector. By providing sensor measurements regarding the light passing quality of the light transmissive body of the light transmissive cover along two separate light guide paths and by relating the sensor measurements of the first and second light detectors, the indication regarding the extent of erosion may be deduced from a broader data set. By using the sensor measurements from two light detectors, the relative developments of the two light guide paths may be used for determining a particularly reliable indication regarding the extent of erosion.

According to an embodiment, the exterior aircraft light is configured to provide the indication regarding the extent of erosion of the exterior surface of the light transmissive cover on the basis of difference values of the sensor measurements of the first light detector and the sensor measurements of the second light detector. Additionally/alternatively, the exterior aircraft light may be configured to provide the indication regarding the extent of erosion of the exterior surface of the light transmissive cover on the basis of ratio values of the sensor measurements of the first light detector and the sensor measurements of the second light detector.

According to an embodiment, the exterior aircraft light is a fuselage-mounted red-flashing beacon light and the second light guide path extends between a left side portion of the light transmissive cover and a right side portion of the light transmissive cover.

According to an embodiment, the exterior aircraft light is a wing front edge light and the second light guide path extends laterally along the light transmissive cover outside of a wing front edge portion of the light transmissive cover or the second light guide path extends between a top portion and a bottom portion of the light transmissive cover across the wing front edge portion of the light transmissive cover.

In the described exemplary embodiments with a first light guide path and a second light guide path, the extent of erosion of the exterior surface of the light transmissive cover can be detected based on difference values or ratio values of the amount of light passing through different light guide paths and detected by the first light detector and the second light detector under the same conditions, e.g. the same ambient light, resulting in partially or fully cancelling out the ambient conditions and thereby obtaining a highly precise value of the extent of erosion of the exterior surface of the light transmissive cover. With the described arrangements of the first light guide path and the second light guide paths, the first and second light guide paths are affected differently by erosion, such that an increasing spread in the sensor measurements over time may provide a highly reliable indication regarding the extent of erosion.

According to an embodiment, the exterior aircraft light has at least one of the following features: wherein the exterior aircraft light further comprises a second optical diverter, the second optical diverter being arranged to couple a portion of the light, emitted by the at least one light source, into the light transmissive cover at the second light entry region; wherein the exterior aircraft light further comprises a second light emitter, which is arranged to emit light into the light transmissive cover at the second light entry region, wherein the exterior aircraft light in particular further comprises a second light entry optical coupler arranged to guide light from the second light emitter into the second light transmissive cover at the second light entry region; wherein the exterior aircraft light further comprises a second light exit optical coupler arranged to guide light from the second light exit region to the second light detector; wherein the second light detector and/or the second light emitter are arranged on a back side of the support, wherein the exterior aircraft light in particular further comprises a second light exit reflector arranged to reflect light from the second light exit region to the second light detector and/or a second light entry reflector arranged to reflect light from the second light emitter to the second light entry region. The additional features, modification, and effects, as described above with respect to the first optical diverter, the first light emitter, the first light entry optical coupler, the first light exit optical coupler, the first light exit reflector, and the first light entry reflector, apply to the second optical diverter, the second light emitter, the second light entry optical coupler, the second light exit optical coupler, the second light exit reflector, and the second light entry reflector in an analogous manner.

According to an embodiment, the exterior aircraft light further comprises at least one optical element, such as at least one lens and/or at least one reflector and/or at least one shutter, arranged over the at least one light source for shaping an output light intensity distribution of the exterior aircraft light. In particular, the optical element(s) may be configured to shape the output light intensity distribution of the exterior aircraft light unit into one or more lateral directions. Further in particular, the exterior aircraft light unit may be any of a navigation light, a white strobe anti-collision light, and a red-flashing beacon light unit, and the optical element(s) may be arranged to shape the output light intensity distribution of the navigation light/white strobe anti-collision light/red-flashing beacon light.

Exemplary embodiments of the invention further include an aircraft comprising at least one exterior aircraft light according to an exemplary embodiment of the invention. The aircraft may be an air plane or a rotorcraft, such as a helicopter.

Exemplary embodiments of the invention further include a method for providing an indication regarding an extent of erosion of an exterior surface of a light transmissive cover of an exterior aircraft light, the light transmissive cover having a light transmissive body with an interior surface and an exterior surface, the method comprising: routing light along a first light guide path within the light transmissive body from a first light entry region to a first light exit region; with a first light detector, receiving light that travels along the first light guide path and that exits the light transmissive cover at the first light exit region and providing sensor measurements corresponding to the amount of light incident on the first light detector; and providing the indication regarding the extent of erosion of the exterior surface of the light transmissive cover on the basis of the sensor measurements of the first light detector. The method may further comprise: routing light along a second light guide path within the light transmissive body from a second light entry region to a second light exit region; with a second light detector, receiving light that travels along the second light guide path and that exits the light transmissive cover at the second light exit region and providing sensor measurements corresponding to the amount of light incident on the second light detector; and providing the indication regarding the extent of erosion of the exterior surface of the light transmissive cover on the basis of the sensor measurements of the first light detector and the sensor measurements of the second light detector. The additional features, modifications, and effects, as described above with respect to the exterior aircraft light, apply to the method for providing an indication regarding an extent of erosion of an exterior surface of a light transmissive cover of an exterior aircraft light in an analogous manner.

BRIEF DESCRIPTION OF THE DRAWINGS

Further exemplary embodiments of the invention are described below with respect to the accompanying drawings, wherein:

FIG. 1 depicts a schematic perspective view of selected components of an exterior aircraft light according to an exemplary embodiment of the invention.

DETAILED DESCRIPTION

Figure 2A:
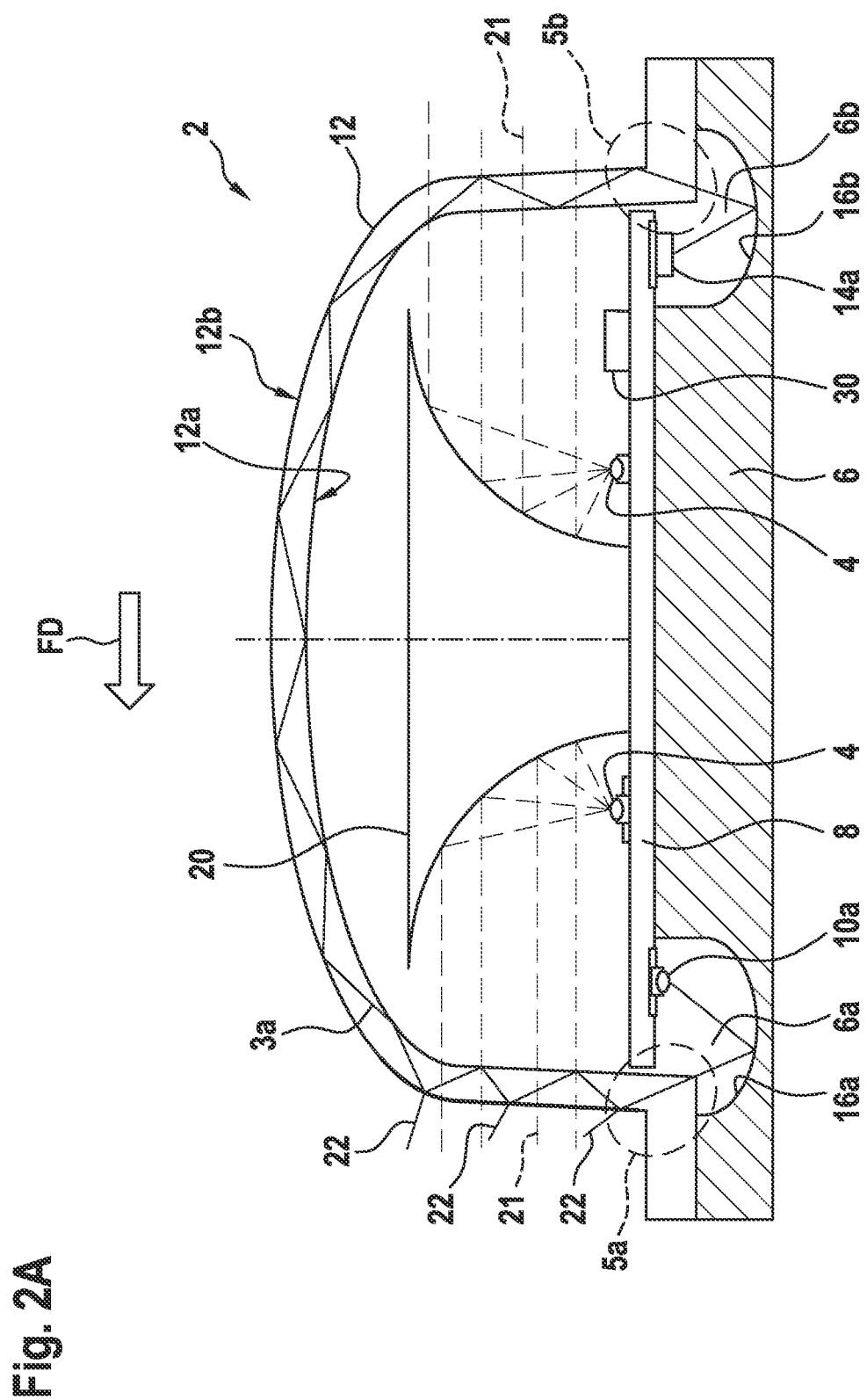
FIGS. 2A and 2B depict cross-sectional views of an aircraft beacon light according to an exemplary embodiment of the invention.

FIG. 1 depicts a schematic perspective view of selected components of an exterior aircraft light 2 according to an exemplary embodiment of the invention. In FIG. 1, a light transmissive cover 12 of the exterior aircraft light 2 is shown, but, for ease of explanations, other main components like a support, one or more light sources for providing the desired aircraft light functionality, and an optical element arranged over the light source(s) for shaping an output light intensity distribution of the exterior aircraft light are omitted. The light transmissive cover 12 comprises a light transmissive body with an interior surface, facing the interior of the exterior aircraft light 2, and an exterior surface, facing the exterior of the exterior aircraft light 2.

The exterior aircraft light 2 further comprises a first light emitter 10a and a first light detector 14a. The first light emitter 10a is arranged to emit light into the light transmissive body of the light transmissive cover 12 at a first light entry region 5a. The first light detector 14a is arranged to receive at least part of the light, emitted by the first light emitter 10a, after having travelled through a first light guide path 3a formed in the light transmissive body. In an embodiment, the first light emitter 10a and the first light detector 14a are arranged in the vicinity of the first light entry region 5a and the first light exit region 5b, respectively. The first light emitter 10a and the first light detector 14a may for example be arranged on an upper side of a support (not shown) supporting the light source(s) (not shown), with the upper side of the support facing the interior surface of the light transmissive cover 12. It is also possible that the first light emitter 10a and the first light detector 14a are arranged on a back side of the support. In another embodiment, the first light emitter 10a may be omitted and, instead, part of the light, emitted by the light source(s), may be guided, using an optical diverter or an optical coupler, into the first light guide path 3a at the first light entry region 5a. Such embodiments will be described in detail below.

The first light guide path 3a extends through the light transmissive body of the light transmissive cover 12 from the first light entry region 5a to the first light exit region 5b and is substantially aligned with a flight direction ("FD") of an aircraft, when the exterior aircraft light 2 is mounted thereto. That is, when the exterior aircraft light 2, which is a red-flashing beacon light in the exemplary embodiment of FIG. 1, is mounted to a top portion or a bottom portion of a fuselage of the aircraft, a front surface of the light transmissive cover 12, which is on the side of the first light entry region 5a, will be exposed to more hazardous conditions, e.g. larger aerodynamic forces and more particle impact, than surfaces on the other sides of the light transmissive cover 12, i.e. surfaces on a back side and left/right sides with respect to the flight direction. This will result in heavier erosion on the surface of the front side of the light transmissive cover 12 than those of the other sides. Such erosion is very hard to be assessed in an objective manner with previous approaches and can be assessed in a more accurate and reliable manner with the exterior aircraft light 2 in accordance with an exemplary embodiment of the invention.

The exterior aircraft light 2 further comprises a second light emitter 10b and a second light detector 14b, which are optional. The second light emitter 10a is arranged to emit light into the light transmissive body of the light transmissive cover 12 at the second light entry region 5c. The second light detector 14b is arranged to receive at least part of the light, emitted by the second light emitter 10b, after having travelled through a second light guide path 3b formed in the light transmissive body. The second light guide path 3b extends through the light transmissive body of the light transmissive cover 12 from the second light entry region 5c to the second light exit region 5d and is substantially aligned with a direction ("PD") perpendicular to the flight direction, when the exterior aircraft light 2 is mounted to the aircraft. Specific arrangements of the second light emitter 10b and the second light detector 14b are similar to those of the first light emitter 10a and the first light detector 14a, which will be described in detail below.

In operation, at least part of the light, emitted by the first light emitter 10a, travels through the first light guide path 3a to arrive at the first light detector 14a, which is configured to provide sensor measurements corresponding to the amount of light incident on, i.e. detected by, the first light detector 14a. Also, at least part of the light, emitted by the second light emitter 10b, travels through the second light guide path 3b to arrive at the second light detector 14b, which is configured to provide sensor measurements corresponding to the amount of light incident on/detected by the second light detector 14b.

The exterior aircraft light 2 may further comprise a controller (not shown) which is configured to provide an indication regarding an extent of erosion of the exterior surface of the light transmissive cover 12 based on the sensor measurements of the first light detector 14a and, optionally, of the second light detector 14b.

In an embodiment, the controller may use the sensor measurements of the first light detector 14a only, in order to determine the extent of erosion of the exterior surface of the light transmissive cover 12. In particular, the controller may make a comparison of the detected amount of light with a threshold value, which may be set based on an initial amount of light which is detected by the first light detector 14a before the exterior aircraft light is used in the filed. The controller may provide the comparison result on a monitor (not shown) or via an audio alarm through a speaker (not shown) or via a visual indicator, such as an indicator LED. On the basis of the comparison result, the controller or an external data processing entity, such as a central maintenance computer, or the maintenance personal may decide whether or not the exterior aircraft light 2 or the light transmissive cover 12 is to be replaced.

In another embodiment, the controller may use the sensor measurements of both the first and second light detectors 14a, 14b, in order to determine the extent of erosion of the exterior surface of the light transmissive cover 12. In particular, the controller may determine the extent of erosion of the exterior surface of the light transmissive cover 12 by comparing the sensor measurements of the first light detector 14a and the sensor measurements of the second light detector 14b, i.e. based on a difference value or a ratio value of the amount of light detected by the first light detector 14a and the amount of light detected by the second light detector 14b. The controller or an external data processing entity, such as a central maintenance computer, or the maintenance personal may decide whether or not the exterior aircraft light 2 or the light transmissive cover 12 is to be replaced based on the difference value of the ratio value.

In a further embodiment, the controller may not be part of the exterior aircraft light 2. The exterior aircraft light 2 may provide an external data processing entity, such as a central maintenance computer, with the sensor measurements of the first light detector 14a and, optionally, of the second light detector 14b. The external data processing entity may determine and provide the indication regarding the extent of the erosion of the exterior surface of the light transmissive cover 12 based on the sensor measurements in an analogous manner as stated above.

Figure 2B:
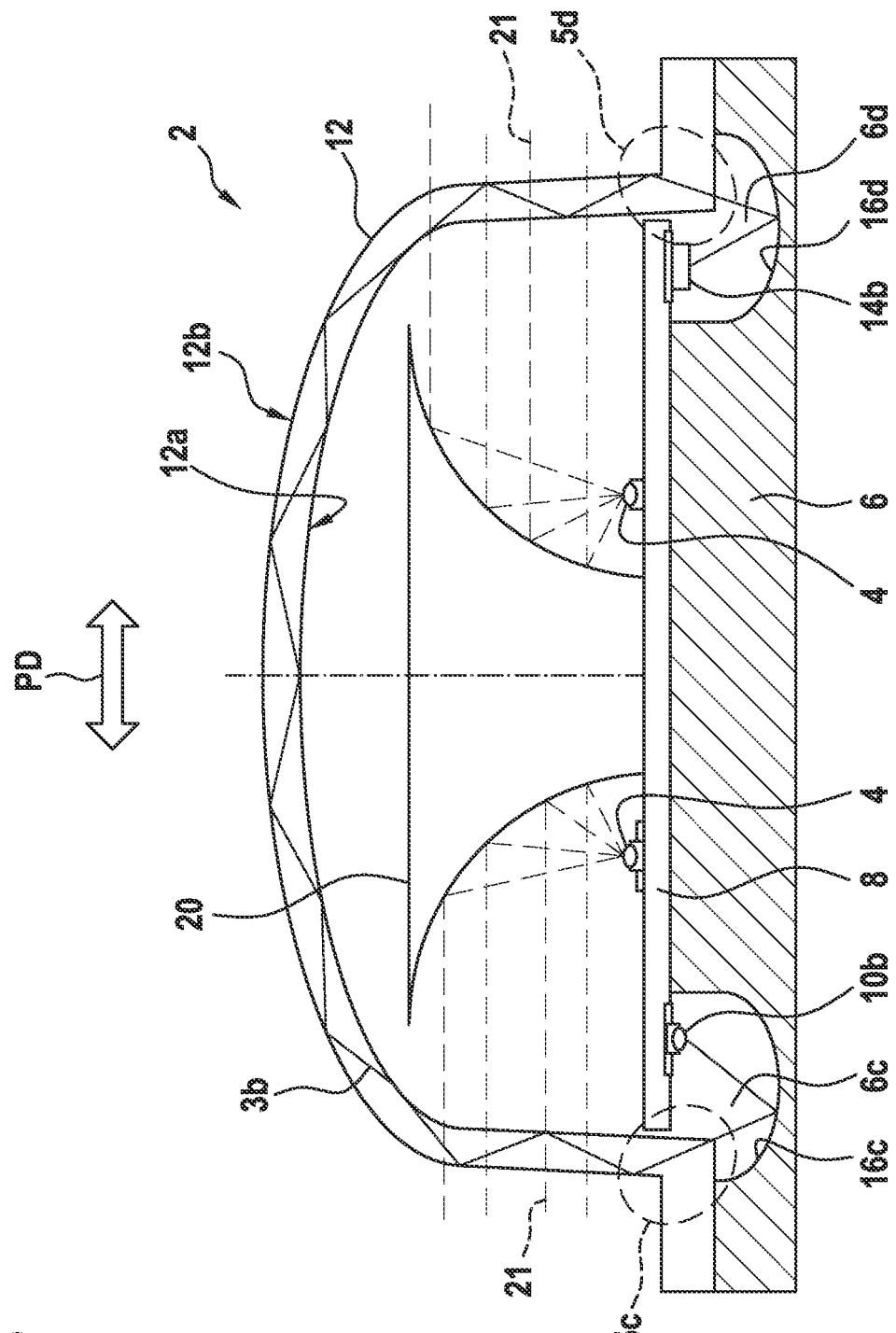

FIGS. 2A and 2B depict cross-sectional views of a red-flashing aircraft beacon light 2 according to an exemplary embodiment of the invention. FIG. 2A is a vertical cross-sectional view through a center of the aircraft beacon light 2, with the cross-sectional plane extending along a flight direction ("FD") of an aircraft, when the aircraft beacon light 2 is mounted to the aircraft. FIG. 2B is a vertical cross-sectional view through a center of the aircraft beacon light 2, with the cross-sectional plane extending along a direction ("PD") perpendicular to the flight direction of the aircraft, when the aircraft beacon light 2 is mounted to the aircraft.

The aircraft beacon light 2 comprises a base 6 for supporting a support 8 and a light transmissive cover 12. The support 8, which may be a printed circuit board (PCB), supports a plurality of light sources 4, which repeatedly emit beacon light flashes in operation. The light sources 4 are in particular configured for emitting red light. The light sources 4 may be or may include LEDs. The plurality of light sources 4 are arranged on the support 8 in an annular configuration, such that they can emit light in all radial directions around the aircraft, in particular for emitting light into a set of directions which, when projected onto a horizontal plane, cover an angle of 360° around the aircraft beacon light 2.

The aircraft beacon light 2 further comprises an optical element 20, which is a reflector in the depicted example and which is configured to shape an output light intensity distribution of the beacon light 2 from light emitted by the light sources 4. The optical element 20 is supported by the support 8 and is arranged over the plurality of light sources 4. In FIGS. 2A and 2B, the optical element 20 is shaped such that light, emitted by the light sources 4, can be reflected into radial directions to achieve a high output light intensity around the horizontal plane, as required by aircraft beacon lights. The light output is illustrated via exemplary light rays, indicated by the reference number 21. It is understood that not all of the light, coming from the light sources 4, is collimated in the horizontal plane. Rather, the plurality of light sources 4 and the optical element 20 may be arranged and shaped to provide a beacon light output for the upper or lower hemisphere in accordance with Federal Aviation Regulations section 25.1401. Alternatively, the optical element 20 may be a unitary lens structure encasing the light sources 4. In particular, the optical element 20 may be a solid structure that fills the entire space between its outer surface and the light sources 4.

The aircraft beacon light 2 further comprises a first light emitter 10a, a first light detector 14a, a second light emitter 10b, and a second light detector 14b, which are mounted to a back side of the support 8, i.e. to the lower side of the support 8 in the depicted orientation of the aircraft beacon light 2. In other words, the first light emitter 10a, the first light detector 14a, the second light emitter 10b, and the second light detector 14b are arranged on the opposite side of the support 8, as compared to where the light sources 4 are arranged. First to fourth recesses 6a-6d are formed at four portions of the base 6, facing those four portions of the support 8 where the first light emitter 10a, the first light detector 14a, the second light emitter 14a, and the second light detector 14b are mounted. The first and third recesses 6a, 6c have first and third surfaces 16a, 16c, reflecting at least part of the light, emitted by the first and second light emitters 10a, 10b, to be guided into the first light guide path 3a and the second light guide path 3b, respectively. The second and fourth recesses 6b, 6d have second and fourth surfaces 16b, 16d, reflecting at least part of the light, traveling through the first and second light guide paths 3a, 3b, to be directed to the first and second light detectors 14a, 14b, respectively.

The first surface 16a and the third surface 16c may be embodied as a first light entry reflector and a second light entry reflector, each being shaped in a way for light, emitted by the first light emitter 10a and the second light emitter 10b, to be well guided into the first light guide path 3a and the second light guide path 3b, respectively. Likewise, the second surface 16b and the fourth surface 16d may be embodied as a first light exit reflector and a second light exit reflector, each being shaped in a way for light, passing through the first light guide path 3a and the second light guide path 3b, to be well directed to the first light detector 14a and the second light detector 14b, respectively. It may also be possible for each of the first light emitter 10a, the second light emitter 10b, the first light detector 14a, and the second light detector 14b to be combined with an optical coupler (not shown) to guide light into a desired direction. In particular, a first light entry optical coupler and a second light entry optical coupler may be arranged in the first recess 6a and the third recess 6c, such that at least part of the light, emitted by the first light emitter 10a and the second light emitter 10b, is directed in a targeted manner to the first light guide path 3a and the second light guide path 3b, respectively. Likewise, a first light exit optical coupler and a second light exit optical coupler may be arranged in the second recess 6b and the fourth recess 6d, such that at least part of the light, traveling through the first light guide path 3a and the second light guide path 3b, is directed in a targeted manner to the first light detector 14a and the second light detector 14b, respectively. It may also be possible for both a light reflector and a light coupler to be arranged in each recess 6a-6d.

The aircraft beacon light 2 further comprises a controller 30, which is configured to control overall operations of the aircraft beacon light 2 and to evaluate the sensor measurement outputs, provided by the first and second light detectors 14a, 14b, in order to determine an extent of erosion of the exterior surface of the light transmissive cover 12 of the aircraft beacon light 2. The controller 30 performs the same functionalities as described above with reference to FIG. 1. As discussed above, the controller 30 may use the sensor measurements of the first light detector 14a only, in order to determine the extent of erosion of the exterior surface of the light transmissive cover 12. In this regard, it is pointed out that the second light emitter 10b, the second light detector 14b, and the third and fourth recesses 6c, 6d are optional features.

As explained above, the controller may evaluate the sensor measurements of the first light detector 14a and, optionally, of the second light detector 14b over time. On the front surface of the light transmissive cover 12, more erosion takes place than in other portions of the light transmissive cover 12. Erosion may be seen as a collection of surface imperfections of the exterior surface of the light transmissive cover 12. Exemplary surface imperfections on the front surface of the light transmissive cover 12 are indicated with reference number 22 in FIG. 2A. The surface imperfections 22 have the effect that light hitting the surface imperfections 22 may, instead of experiencing total internal reflection, be coupled out of the light transmissive cover 12 or may be reflected at such an angle that it is coupled out of the light transmissive cover 12, when it hits the interior surface of the light transmissive cover 12 next. In this way, the surface imperfections 22 degrade the quality of the light transmissive cover 12 as a wave guide. With progressing erosion, the share of the light that reaches the first light detector 14a, after having been coupled into and guided through the first light guide path 3a from the first light entry region 5a, decreases. From said decrease of the light reaching the first light detector 14a and/or from an increasing spread in the wave guide quality of the first light guide path 3a and the second light guide path 3b, an accurate and highly reliable determination regarding the extent of erosion of the exterior surface of the light transmissive cover 12 may be obtained.

Figure 3A:
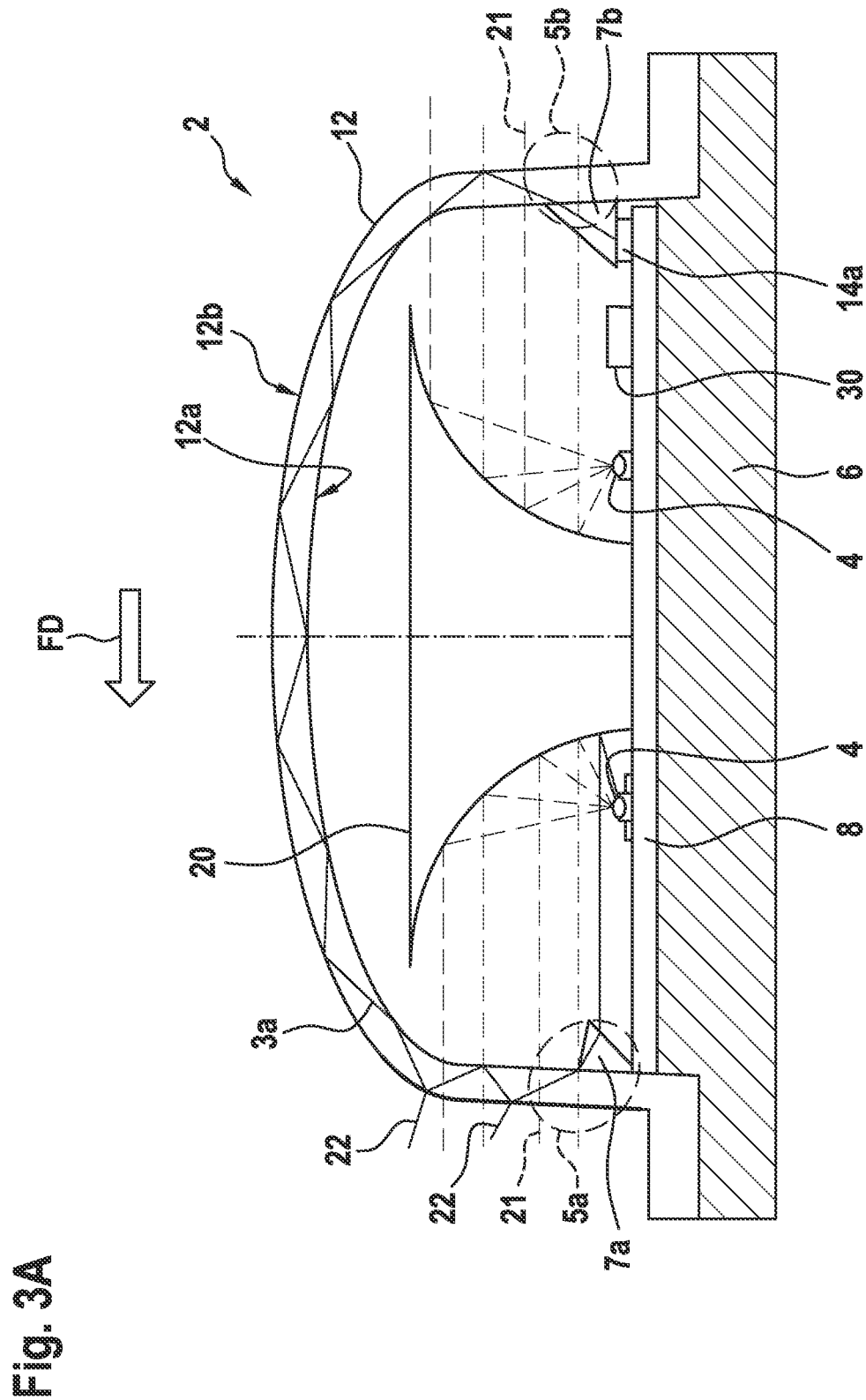
FIGS. 3A and 3B depict cross-sectional views of an aircraft beacon light according to another exemplary embodiment of the invention.
Figure 3B:
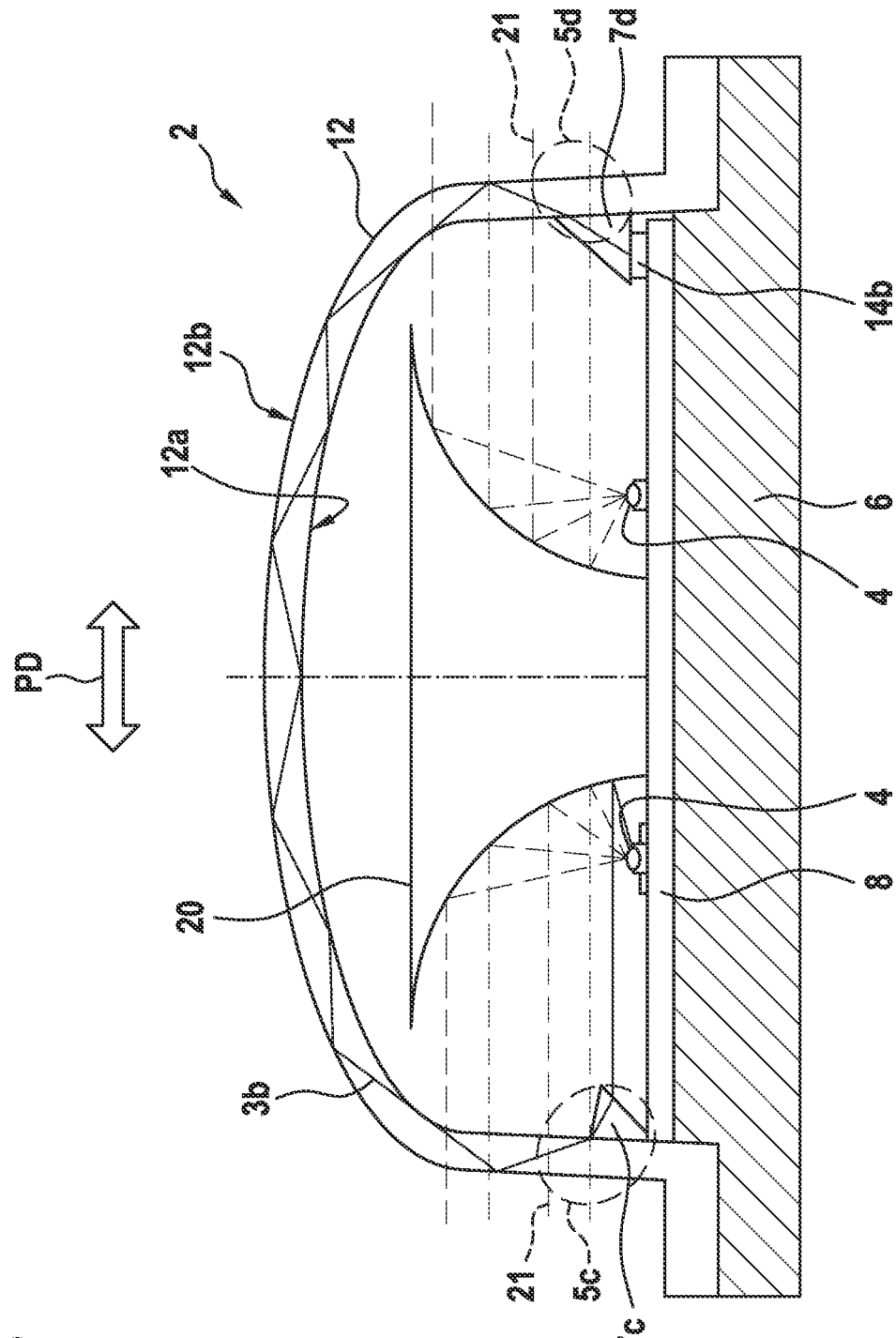

FIGS. 3A and 3B depict cross-sectional views of a red-flashing aircraft beacon light 2 according to another exemplary embodiment of the invention. FIG. 3A is a vertical cross-sectional view through a center of the aircraft beacon light 2, with the cross-sectional plane extending along a flight direction ("FD") of an aircraft, when the aircraft beacon light 2 is mounted to the aircraft. FIG. 3B is a vertical cross-sectional view through a center of the aircraft beacon light 2, with the cross-sectional plane extending along a direction ("PD") perpendicular to the flight direction of the aircraft, when the aircraft beacon light 2 is mounted to the aircraft.

The embodiment of FIGS. 3A and 3B mainly differs from that of FIGS. 2A and 2B in that the first and second light emitters 10a, 10b are omitted and, instead, a portion of the light, emitted by the plurality of light sources 4, is diverted by a first optical diverter 7a and a second optical diverter 7b to be guided into the first light guide path 3a and the second light guide path 3b, respectively. In addition, the first light detector 14a and the second light detector 14b are arranged on the upper side of the support 8, i.e. on the same side of the supper as the light sources 4. In addition, a first light exit optical coupler 7b and a second light exit optical coupler 7d are provided to couple light, passing through the first light guide path 3a and the second light guide path 3b, to the first light detector 14a and the second light detector 14b, respectively. As in the embodiment of FIGS. 2A and 2B, it may also be possible for the first and second light detectors 14a, 14b to be arranged on the back side of the support 8, with the base 6 having the second recess 6b and the fourth recess 6d. In this case, the first and second light exit optical couplers 7b, 7d may be dispensed with.

The aircraft beacon light 2 further comprises a controller 30, which is configured to control overall operations of the aircraft beacon light 2 and to evaluate the sensor measurement outputs, provided by the first and second light detectors 14a, 14b, in order to determine an extent of erosion of the exterior surface of the light transmissive cover 12 of the aircraft beacon light 2. The controller 30 performs the same functionalities as described above with reference to FIG. 1. It is also pointed out that the second optical diverter 7c, the second light detector 14b, and the second light exit optical coupler 7d are optional features.

Figure 4A:
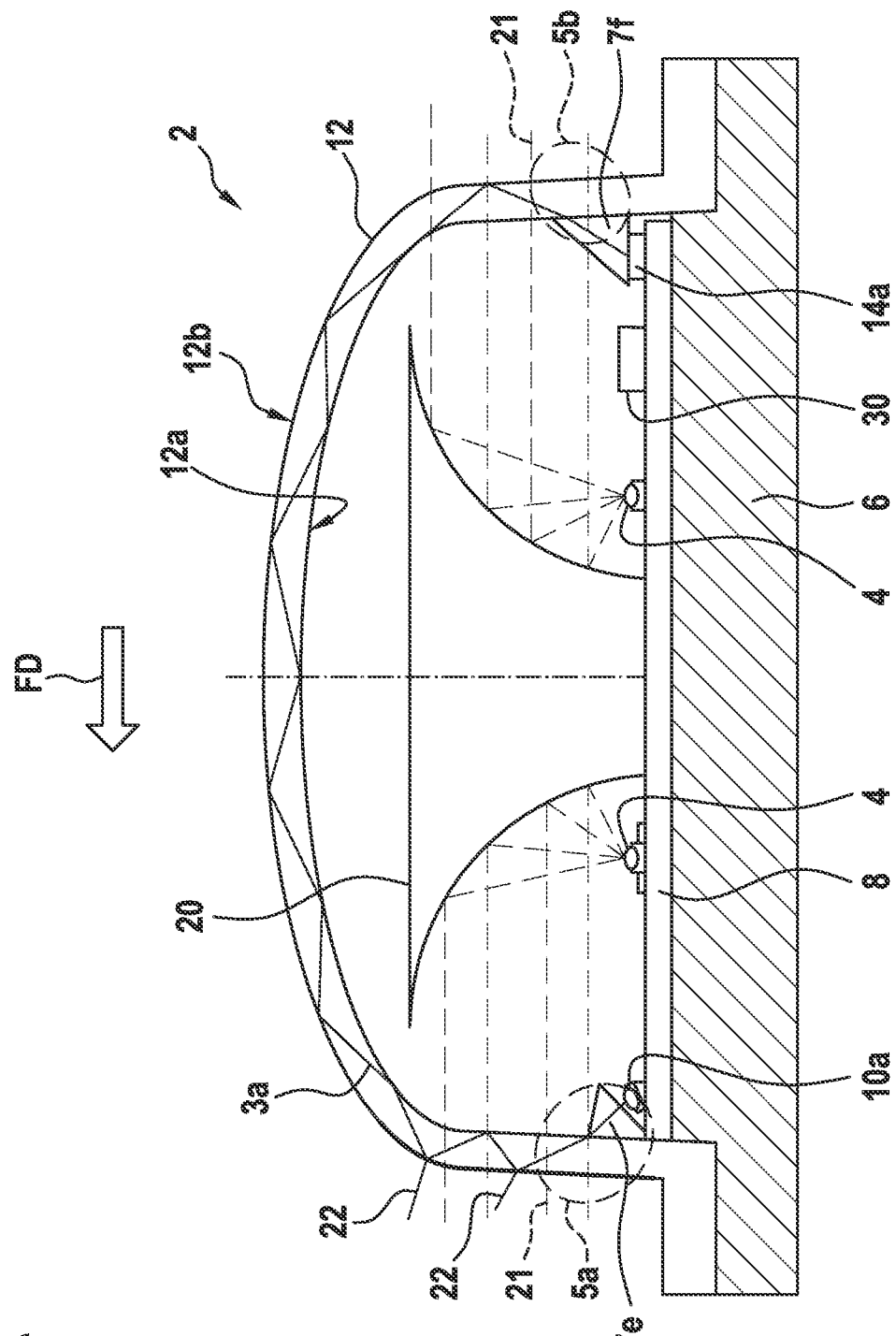
FIGS. 4A and 4B depict cross-sectional views of an aircraft beacon light according to a further exemplary embodiment of the invention.
Figure 4B:
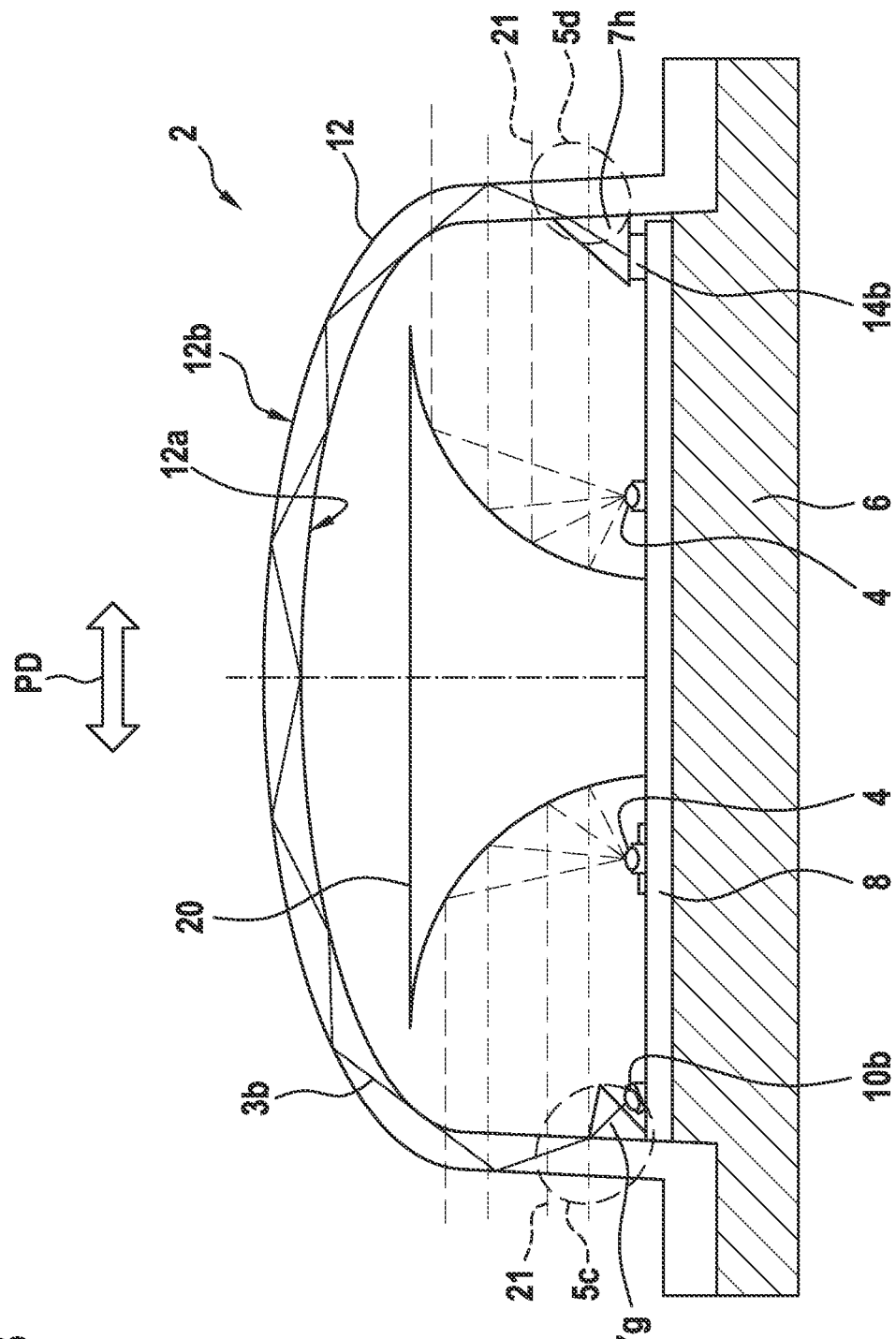

FIGS. 4A and 4B depict cross-sectional views of a red-flashing aircraft beacon light 2 according to a further exemplary embodiment of the invention. FIG. 4A is a vertical cross-sectional view through a center of the aircraft beacon light 2, with the cross-sectional plane extending along a flight direction ("FD") of an aircraft, when the aircraft beacon light 2 is mounted to the aircraft. FIG. 4B is a vertical cross-sectional view through a center of the aircraft beacon light 2, with the cross-sectional plane extending along a direction ("PD") perpendicular to the flight direction of the aircraft, when the aircraft beacon light 2 is mounted to the aircraft.

The embodiment of FIGS. 4A and 4B is different from that of FIGS. 3A and 3B in that a first light emitter 10a and a second light emitter 10b are arranged on the upper side of the support 8 and a first light entry optical coupler 7e and a second light entry optical coupler 7g are provided to guide light from the first light emitter 10a and the second light emitter 10b into the first light guide path 3a and the second light guide path 3b, respectively. That is, separate first and second light emitters 10a, 10b are provided and coupled with the first and second light entry optical couplers 7e, 7g, thereby making light from the first and second light emitters 10a, 10b travel through the first and second light guide paths 3a, 3b, respectively. Reference is made to the explanations of the embodiments of FIGS. 1 to 3 for the other parts of the aircraft beacon light 2 of FIGS. 4A and 4B. In FIGS. 4A and 4B, the first and second light exit optical couplers are indicated with reference numbers 7f and 7h.

Figure 5:
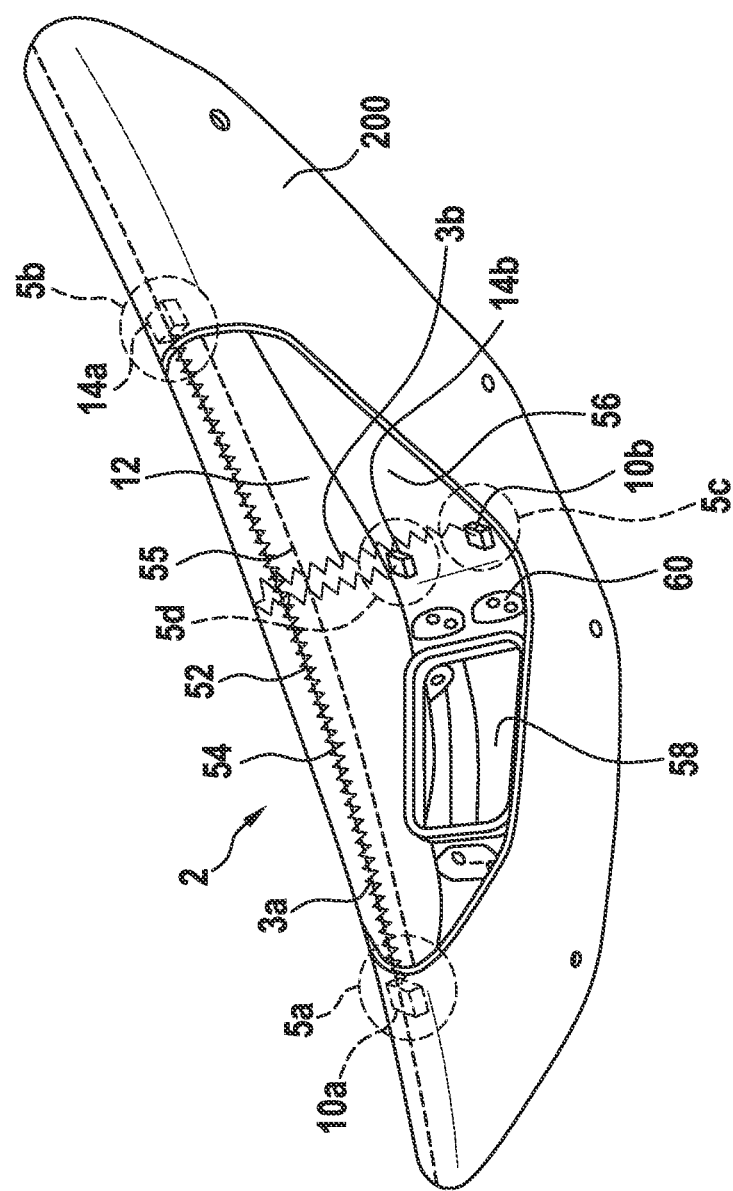
FIG. 5 depicts an exterior aircraft light in accordance with a further exemplary embodiment of the invention in a perspective view.

FIG. 5 depicts an exterior aircraft light 2 in accordance with a further exemplary embodiment of the invention in a perspective view. The exterior aircraft light 2 is included into an aircraft wing 200, a portion of which is depicted in FIG. 5. The exterior aircraft light 2 is a wing front edge light, such as a wing tip navigation light, a wing tip white strobe anti-collision light or a wing tip red-flashing beacon light.

The exterior aircraft light 2 has a mounting structure 56, also referred to as housing of the exterior aircraft light 2, and the light transmissive cover 12. Together, the mounting structure 56 and the light transmissive cover 12 define an interior space of the exterior aircraft light 2. The housing 56 has an opening 58 and mounting elements 60. During manufacture of the exterior aircraft light 2, one or more light sources as well as one or more optical elements (not shown) can be introduced through the opening 58 and can be fixed in position with the help of mounting elements 60. It is also possible that the one or more optical elements and the one or more light sources are fixed in position by other fastening elements.

The light transmissive cover 12 is part of the aerodynamic structure of the aircraft wing 200. In particular, the outer contour of the light transmissive cover 12 is part of the air foil contour of the aircraft wing 200. The light transmissive cover 12 has an aerodynamic front edge 52, which is shown as a dashed line along the light transmissive cover 12 and the aircraft wing 200. The aerodynamic front edge 52 separates an impinging air stream during flight, with a portion of the impinging air stream passing over the top surface of the aircraft wing 200 and with another portion of the impinging air stream passing below the aircraft wing 200. The light transmissive cover 12 further has an aerodynamic front region 54, which is an area extending around the aerodynamic front edge 52. In particular, the aerodynamic front region 54 extends to the upper side and to the lower side of the aerodynamic front edge 52. One border of the aerodynamic front region 54 is indicated by a dashed line 55. The other border of the aerodynamic front region is to the other side of the aerodynamic front edge 52 and is not visible in the viewing direction of FIG. 5.

The light transmissive cover 12 comprises a light transmissive body with an interior surface, facing the interior of the exterior aircraft light 2, and an exterior surface, facing the exterior of the exterior aircraft light 2.

The exterior aircraft light 2 further comprises a first light emitter 10a and a first light detector 14a. The first light emitter 10a is arranged to emit light into the light transmissive body of the light transmissive cover 12 at a first light entry region 5a. The first light detector 14a is arranged to receive at least part of the light, emitted by the first light emitter 10a, after having travelled through a first light guide path 3a formed in the light transmissive body. The first light emitter 10a and the first light detector 14a are arranged in the vicinity of the first light entry region 5a and the first light exit region 5b, respectively.

The first light guide path 3a extends through the light transmissive body of the light transmissive cover 12 from the first light entry region 5a to the first light exit region 5b along the aerodynamic front region 54, which is exposed to more hazardous conditions, e.g. much larger aerodynamic forces and more particle impact, than the other exterior surface portions of the light transmissive cover 12. This will result in heavier erosion of the light transmissive cover 12 around the aerodynamic front edge 52 than at the other surfaces of the light transmissive cover 12 outside of the aerodynamic front region 54. It can also be said that the first light guide path 3a extends along a wing front edge portion of the light transmissive cover 12. The first light guide path 3a extends along a cover portion that experiences heavy erosion in use.

The exterior aircraft light 2 further comprises a second light emitter 10b and a second light detector 14b, which are optional. The second light emitter 10a is arranged to emit light into the light transmissive body of the light transmissive cover 12 at the second light entry region 5c. The second light detector 14b is arranged to receive at least part of the light, emitted by the second light emitter 10b, after having travelled through the second light guide path 3b formed in the light transmissive body. The second light guide path 3b extends through the light transmissive body of the light transmissive cover 12 from the second light entry region 5c to the second light exit region 5d. In the exemplary embodiment of FIG. 5, the second light guide path 3b is perpendicular to the aerodynamic front edge 52 and extends from an upper end portion of the light transmissive cover 12 to a lower end portion of the light transmissive cover. In an alternative embodiment, the second light guide path may extend substantially in parallel to the first light guide path 3a, but outside of the aerodynamic front region 54.

In an embodiment, it may be possible for each of the first and second light emitters 5a, 5c and the first and second light detectors 5b, 5d to be associated with an optical coupler (not shown), in order to guide light into an intended direction.

The aircraft beacon light 2 further comprises a controller (not shown), which is configured to control overall operations of the aircraft beacon light 2 and to evaluate the sensor measurement outputs, provided by the first and second light detectors 14a, 14b, in order to determine an extent of erosion of the exterior surface of the light transmissive cover 12 of the aircraft beacon light 2. The controller 30 performs analogous functionalities as described above with reference to FIGS. 1 to 4.

Figure 6:
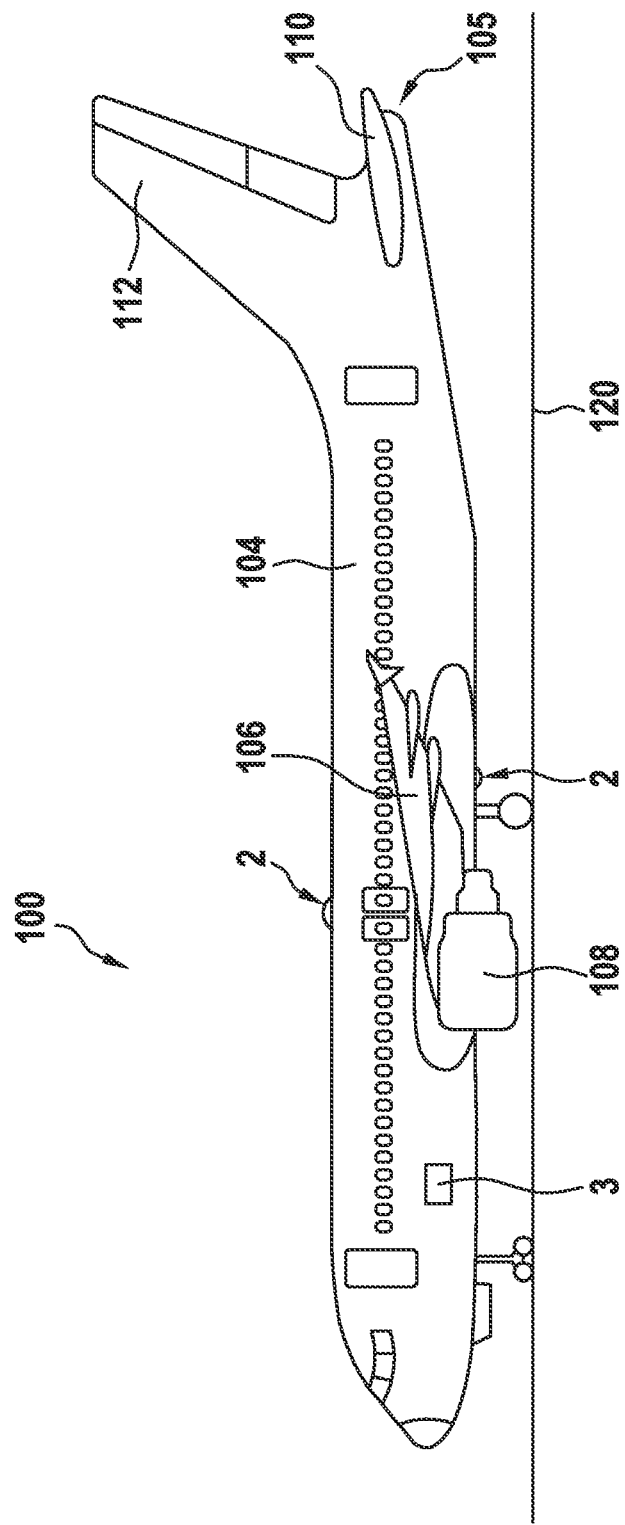
FIG. 6 depicts a schematic side view of an aircraft in accordance with an exemplary embodiment of the invention.

FIG. 6 depicts a schematic side view of an aircraft 100 in accordance with an exemplary embodiment of the invention, which is equipped with two aircraft beacon lights 2 according to exemplary embodiments of the invention.

The aircraft 100 has a fuselage 104 and two wings 106, which are attached to the right and left sides of the fuselage 104. Each of the wings 106 carries an engine 108. Further, two horizontal stabilizers 110 and a vertical stabilizer 112 are mounted to a tail portion of the fuselage 104. In the schematic side view depicted in FIG. 1, only one of the two wings 106, only one of the two engines 108 and only one of the two horizontal stabilizers 110 is visible, respectively. It is pointed out that aircraft in accordance with other designs and constructions are encompassed by exemplary embodiments of the present invention as well.

The aircraft 100 further comprises two aircraft beacon lights 2, mounted to the fuselage 104. An upper aircraft beacon light 2 is mounted to a top portion (roof) of the fuselage 104. A lower aircraft beacon light 2 is mounted to a bottom portion (belly) of the fuselage 104. The aircraft 100 also comprises an aircraft power supply 3 for supplying electric power to electric consumers within the aircraft 100, in particular to the aircraft beacon lights 2.

The aircraft 100 shown in FIG. 6 is an air plane 100, in particular a large passenger or cargo air plane 100. It is pointed out that other types of aircraft, such as smaller air planes, a helicopter or a rotorcraft, may be equipped with aircraft beacon lights 2 or other exterior aircraft lights in accordance with exemplary embodiments of the invention as well.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising:
    a support;
    a light transmissive cover, the light transmissive cover having a light transmissive body with an interior surface and an exterior surface;
    at least one light source arranged between the support and the light transmissive cover; and
    a first light emitter;
    a first light detector;
    wherein the first light emitter and the first light detector are interior to and spaced from the interior surface of the light transmissive cover;
    wherein the light transmissive cover has a first light guide path within the light transmissive body from a first light entry region to a first light exit region,
    wherein the first light transmitter is arranged to emit light into the light transmissive cover at the first light entry region;
    wherein the first light detector is arranged to receive the light that travels along the first light guide path and that exits the light transmissive cover at the first light exit region and wherein the first light detector is configured to provide sensor measurements corresponding to the amount of light incident on the first light detector, and
wherein the exterior aircraft light is configured to provide an indication regarding an extent of erosion of the exterior surface of the light transmissive cover on the basis of the sensor measurements of the first light detector.

2. The exterior aircraft light according to claim 1, further comprising:
a first optical diverter, the first optical diverter being arranged to couple a portion of the light, emitted by the at least one light source, into the light transmissive cover at the first light entry region.

3. The exterior aircraft light according to claim 1, further comprising:
a first light entry optical coupler arranged to guide light from the first light emitter into the first light transmissive cover at the first light entry region.

4. The exterior aircraft light according to claim 1, further comprising:
a first light exit optical coupler arranged to guide light from the first light exit region to the first light detector.

5. The exterior aircraft light according to claim 1, wherein:
at least one of the first light detector and the first light emitter are arranged on a back side of the support; and
the exterior aircraft light further comprises:
at least one of a first light exit reflector arranged to reflect light from the first light exit region to the first light detector and a first light entry reflector arranged to reflect light from the first light emitter to the first light entry region.

6. The exterior aircraft light according to claim 1, wherein:
the exterior aircraft light is configured to provide the indication regarding the extent of erosion of the exterior surface of the light transmissive cover based on a comparison of the detected amount of light with a threshold value; and
the threshold value is set based on an initial amount of light which is detected by the first light detector before the exterior aircraft light is used in the field.

7. The exterior aircraft light according to claim 1, wherein the first light guide path extends between opposing end portions of the light transmissive cover.

8. The exterior aircraft light according to claim 1, wherein the exterior aircraft light is a fuselage-mounted red-flashing beacon light and wherein the first light guide path extends between a front portion of the light transmissive cover and a rear portion of the light transmissive cover.

9. The exterior aircraft light according to claim 1, wherein the exterior aircraft light is a wing front edge light, and wherein the first light guide path extends along a wing front edge portion of the light transmissive cover.

10. The exterior aircraft light according to claim 9, wherein the exterior aircraft light is a wing tip aircraft navigation light, a wing tip white strobe anti-collision light or a wing tip red-flashing beacon light.

11. An exterior aircraft light according to claim 1, further comprising:
a second light detector;
wherein the light transmissive cover has a second light guide path from a second light entry region o a second light exit region;
wherein the second light detector is arranged to receive light that travels along the second light guide path and that exits the light transmissive cover at the second light exit region and wherein the second light detector is configured to provide sensor measurements corresponding to the amount of light incident on the second light detector; and
wherein the exterior aircraft light is configured to provide the indication regarding the extent of erosion of the exterior surface of the light transmissive cover on the basis of the sensor measurements of the first light detector and the sensor measurements of the second light detector.

12. The exterior aircraft light according to claim 11,
wherein the exterior aircraft light is configured to provide the indication regarding the extent of erosion of the exterior surface of the light transmissive cover on the basis of difference values of the sensor measurements of the first light detector and the sensor measurements of the second light detector;
or
wherein the exterior aircraft light is configured to provide the indication regarding the extent of erosion of the exterior surface of the light transmissive cover on the basis of ratio values of the sensor measurements of the first light detector and the sensor measurements of the second light detector.

13. The exterior aircraft light according to claim 11,
wherein the exterior aircraft light is a fuselage-mounted red-flashing beacon light and wherein the second light guide path extends between a left side portion of the light transmissive cover and a right side portion of the light transmissive cover;
or
wherein the exterior aircraft light is a wing front edge light and wherein the second light guide path extends laterally along the light transmissive cover outside of a wing front edge portion of the light transmissive cover or wherein the second light guide path extends between a top portion and a bottom portion of the light transmissive cover across the wing front edge portion of the light transmissive cover.

14. The exterior aircraft light according to claim 11,
wherein the exterior aircraft light further comprises a second optical diverter, the second optical diverter being arranged to couple a portion of the light, emitted by the at least one light source, into the light transmissive cover at the second light entry region;
wherein the exterior aircraft light further comprises a second light emitter, which is arranged to emit light into the light transmissive cover at the second light entry region, wherein the exterior aircraft light further comprises a second light entry optical coupler arranged to guide light from the second light emitter into the second light transmissive cover at the second light entry region;
wherein the exterior aircraft light further comprises a second light exit optical coupler arranged to guide light from the second light exit region to the second light detector; and
wherein the at least one of the second light detector and the second light emitter are arranged on a back side of the support, wherein the exterior aircraft light further comprises at least one of a second light exit reflector arranged to reflect light from the second light exit region to the second light detector and a second light entry reflector arranged to reflect light from the second light emitter to the second light entry region.

15. An aircraft comprising:
at least one exterior aircraft light according to claim 1.

16. A method for providing an indication regarding an extent of erosion of an exterior surface of a light transmissive cover of an exterior aircraft light, the light transmissive cover having a light transmissive body with an interior surface and an exterior surface, the method comprising:
routing light along a first light guide path within the light transmissive body from a first light entry region to a first light exit region;
with a first light emitter interior to and spaced from the interior surface of the light transmissive cover, emitting light into the light transmissive cover at the first light entry region;
with a first light detector interior to and spaced from the interior surface of the light transmissive cover, receiving the light that travels along the first light guide path and that exits the light transmissive cover at the first light exit region and providing sensor measurements corresponding to the amount of light incident on the first light detector;
providing the indication regarding the extent of erosion of the exterior surface of the light transmissive cover on the basis of the sensor measurements of the first light detector;
routing light along a second light guide path within the light transmissive body from a second light entry region to a second light exit region;
with a second light detector, receiving light that travels along the second light guide path and that exits the light transmissive cover at the second light exit region and providing sensor measurements corresponding to the amount of light incident on the second light detector; and
providing the indication regarding the extent of erosion of the exterior surface of the light transmissive cover on the basis of the sensor measurements of the first light detector and the sensor measurements of the second light detector.

* * * * *